(12) United States Patent
Gagnade

(10) Patent No.: US 9,475,411 B2
(45) Date of Patent: Oct. 25, 2016

(54) CHILD CAR SEAT, INTENDED TO BE JOINED TO THE SEAT OF A MOTOR VEHICLE

(71) Applicant: COSCO MANAGEMENT, INC., Wilmington, DE (US)

(72) Inventor: Philippe Gagnade, Cholet (FR)

(73) Assignee: Dorel Juvenile Group, Inc., Foxboro, MA (US)

( * ) Notice: Subject to any disclaimer, the term of this patent is extended or adjusted under 35 U.S.C. 154(b) by 112 days.

(21) Appl. No.: 14/375,830

(22) PCT Filed: Jan. 29, 2013

(86) PCT No.: PCT/EP2013/051707
§ 371 (c)(1),
(2) Date: Jul. 31, 2014

(87) PCT Pub. No.: WO2013/113708
PCT Pub. Date: Aug. 8, 2013

(65) Prior Publication Data
US 2015/0021962 A1    Jan. 22, 2015

(30) Foreign Application Priority Data

Jan. 31, 2012 (FR) .................................. 12 50907
Mar. 30, 2012 (FR) .................................. 12 52953

(51) Int. Cl.
*A47C 7/38* (2006.01)
*B60N 2/28* (2006.01)
*B60R 21/207* (2006.01)

(52) U.S. Cl.
CPC ........... *B60N 2/2884* (2013.01); *B60N 2/2851* (2013.01); *B60N 2/2872* (2013.01); *B60R 21/2072* (2013.01); *A47C 7/38* (2013.01)

(58) Field of Classification Search
CPC ...................................................... A47C 7/38
USPC .............. 297/216.11, 250.1, 730.1, 734, 738
See application file for complete search history.

(56) References Cited

U.S. PATENT DOCUMENTS

2012/0306243 A1* 12/2012 Oltman ................ B60N 2/2884
                                                                    297/216.11
2013/0062917 A1*  3/2013 Powell ................. B60N 2/2884
                                                                    297/216.11

FOREIGN PATENT DOCUMENTS

| EP | 0816163 | 1/1998 |
|---|---|---|
| EP | 0816163 A1 | 1/1998 |
| EP | 1486384 | 12/2004 |
| EP | 1486384 A2 | 12/2004 |
| FR | 2890343 | 3/2007 |
| FR | 2890343 A1 | 3/2007 |
| WO | 2008031583 | 3/2008 |

(Continued)

OTHER PUBLICATIONS

French Search Report for French Application No. 1252953, Nov. 30, 2012, 5 pages.
English Translation of International Preliminary Report on Patentability for International Application No. PCT/EP2013/051707, Aug. 5, 2014, 5 pages.

(Continued)

*Primary Examiner* — Syed A Islam
(74) *Attorney, Agent, or Firm* — Barnes & Thornburg LLP

(57) ABSTRACT

A juvenile vehicle seat includes a seat bottom, a seat back, and a headrest. The headrest includes a centered head-support panel and left and right side panels arranged to locate the centered head-support panel therebetween.

33 Claims, 5 Drawing Sheets

(56) References Cited

FOREIGN PATENT DOCUMENTS

| WO | 2008031583 A2 | 3/2008 |
| WO | 2008068166 | 6/2008 |
| WO | 2008068166 A1 | 6/2008 |

OTHER PUBLICATIONS

International Search Report and Written Opinion of Application No. PCT/EP2013/051707 dated Aug. 19, 2013.

* cited by examiner

CHILD CAR SEAT, INTENDED TO BE JOINED TO THE SEAT OF A MOTOR VEHICLE

CROSS REFERENCE TO RELATED APPLICATIONS

This application is a U.S. nationalization under 35 U.S.C. §371 of International Application No. PCT/EP2013/051707, filed Jan. 29, 2013, which claims priority to French Application Nos. 1250907 and 1252953, filed Jan. 31, 2012 and Mar. 30, 2012 (respectively).

FIELD OF THE INVENTION

The field of the invention is that of child care. More precisely, the invention relates to child seats, also called "car seats", intended to be installed on the passenger seats of vehicles, in particular motor vehicles.

More precisely, the invention aims to improve the safety and the protection of children transported in such car seats, in particular on the head and the neck.

PRIOR ART AND DISADVANTAGES

Many child seats are known intended to be installed in an automobile. These seats are generally formed of a seat bottom and a seat back defining an armchair, wherein the child is installed. The seat bottom generally has armrests, and the seat back lateral extensions, extending substantially above the armrests, and called side flanks in the following. The seat back is in general equipped with a headrest, which can be mobile in height in relation to this seat back. This headrest forms a support zone for the child's head, and has a back portion, substantially parallel to the back of the seat back, and side extensions, called cheeks in the following.

A safety harness is provided in order to maintain the child in the seat constituted as such, at least as long as the child has not reached a minimum weight and/or size.

However, these seats have many disadvantages of which the principle resides in an inadequacy in guaranteeing a sufficient protection of the child, in particular on his head and his neck, in particular in the event of a side impact.

Indeed, car seats propose to maintain the bust of the child by means of the safety harness integrated into the seat or by means of a safety belt of the vehicle, when the child is older.

However, the centre of gravity of the head is located before the junction between the skull and the cervical column. At the time of a side impact, the torso gives way under the head which is turned towards the point of impact as a pivot and as side bending. This movement tends to separate the vertebral bodies from the side opposite the impact and pivots them. Dislocations, torn ligaments and/or side fractures by compression can result. Indeed, it is observed for a side impact, the HIC value (head injury criterion) can reach 2000 (and even more), which is twice the value over which the gravity of the injuries to the brain can be fatal.

As such, the safety harness or the safety belt do not make it possible to maintain the child's head immobile in the event of a side impact.

Automobile manufacturers are increasingly offering "airbags" for protecting the head. However these airbags are not effective and are even dangerous for the protection of very small children, as they strike the side of the seat, generating a violent displacement and/or deformation of the latter, with this displacement then being transmitted to the body, and in particular to the head, of the child.

Furthermore, another major disadvantage of the seats known to those skilled in the art resides in particular in their inadequacy to the morphological changes of the child that take place during growth. For example, certain seats intended for newborns propose a deep and padded shell and intended to absorb the energy of a side impact. However these seats quickly become cramped and non-adapted to the growth of the child.

To overcome this, car seats for example described in patent document EP 0816163, aim to improve the safety of the child by proposing settings for the separation of side extensions carried out according to the setting of the height of a headrest thanks to connecting means.

However, due to the minimum separation of the cheeks from the headrest required for the comfort and the vision of the child, such seats do not make it possible to prevent the child's head from moving, or brutally "tapping", which can result in injury to or the impact of the child's head against the ends of the headrest, in the event of a violent impact.

OBJECTIVES OF THE INVENTION

The invention therefore aims to provide a car seat that makes it possible to improve the safety of the child sitting in this car seat, in particular in terms of protecting his head, his neck and his vertebral column.

The invention also aims to provide, in at least one embodiment, a car seat that offers such a protection while still allowing to adapt the seat to the size and to the comfort of the child.

The invention also aims to provide, in at least one embodiment, a car seat that avoids the driver of the vehicle from having to worry about the triggering of the optimum protection of the child's head in the event of a side impact.

Generally, this invention has for object to reduce the risk of injury on the child's head, while still providing him with comfort that is adapted and which changes according to his age.

DISCLOSURE OF THE INVENTION

These objectives, as well as others which shall appear more clearly in what follows are achieved using a child car seat, intended to be installed in particular in a motor vehicle and comprising a seat bottom, a seat back provided with side flanks and a headrest having a back portion, substantially parallel to the seat back, and two side cheeks extending from said back portion.

The car seat according to the invention is characterised in that said seat comprises means for controlling a displacement of at least a portion of said side cheeks between a first transport position, and a second safety position, wherein said mobile portion of the cheek is moved closer to the child's head according to said displacement, with the latter being predetermined and controlled by said means for controlling.

In other terms, at least one portion of each of the side cheeks of the headrest is designed in such a way as to be mobile, in a controlled and mastered way (to be distinguished, of course, from an accidental deformation, uncontrolled, and therefore very dangerous) between at least two predefined positions:
  a first transport position,
  a second safety position, wherein this mobile portion is moved closer to the child's head.

In all of the text, the terms "violent impact" evokes an impact of a force greater than a predetermined threshold, for example during the design phase, and which endangers the safety of the child.

A car seat according to the invention therefore makes it possible to provide both the comfort and the safety of the child in the event of a violent impact. In particular, in the absence of danger, the headrest is located in the first transport position. This transport position corresponds for example to a sufficient separation of the side cheeks allowing the child to turn his head, to clear his field of vision and as such providing him with a certain degree of comfort. More than a simple pleasure, this notion of comfort participates in the safety of the child. Indeed, a situation of discomfort could lead the child to change by himself, or by putting pressure on his surroundings, the settings of the seat and as such jeopardise his own safety in the event of an impact.

In the event of the appearance of a violent side impact, the headrest adopts a second safety position, wherein at least one side cheek—and where applicable both—is moved closer to the child's head, thus providing a blocking of the child's head as soon as the violent impact appears.

Because of this, the separation of the side cheeks is modified at the time of a violent impact in order to reach a safety position.

The safety position according to the invention makes it possible indeed to prevent a displacement and a substantial acceleration of the head, leading to a maintaining of the axis of the child's head in the extension of the axis of the abdomen and a significant attenuation of the violence of the impact for the head. In other terms, when the cheeks of the headrest are in the safety position, the risks of injury to the head, the neck or the vertebral column of the child are reduced.

According to the embodiments of the invention, such a modification in the separation of the side cheeks is symmetrical and/or asymmetrical. Indeed, according to the direction of the impact a safety position can be considered in a separate manner for each side cheek.

According to the invention, such a modification in the separation between the side cheeks in order to switch from a transport position to a safety position therefore depends solely on the presence of a violent impact. Consequently, modifying the separation of the side cheeks in order to switch to safety position is independent of the setting of the height of the headrest.

In other terms, the separation between the side cheeks is modified at the time a violent impact occurs for example without resulting in a modification of the height of the headrest.

Implementing the modification of the separation of the side cheeks according to the invention is therefore separate from that proposed according to prior art in that it depends on the presence of a violent impact, not a setting in height of the headrest and therefore makes it possible to pass from a transport position to a safety position.

On the contrary, modifying the separation of the side cheeks according to prior art makes it possible solely to change the transport position according to the change in the child's size and does not provide any solution in order to improve the safety of the child in the event of a violent impact.

The safety position therefore cannot be correlated with a modification in the separation of the side cheeks of the positions of transport according to the change in the size of the child.

Indeed, the more the child grows the more the side cheeks in transport position will be separated in order to provide him with a comfort of displacement of his face during safe transport.

On the contrary, in order to switch to safety position, modifying the separation of the side cheeks implemented according to the invention, at the time a violent impact occurs, aims to protect the child's head from any displacement.

The known systems for adjusting therefore suppose manual settings, and an intervention from a user, in order to place the cheeks in the desired position. On the other hand, in the framework of the invention, there is of course no human action: the cheek or cheeks automatically switch into the safety position, in the presence of a violent impact.

A car seat according to the invention also makes it possible to guarantee the passing from the transport position to the safety position as soon as a violent side impact appears and this, independently of the operator that has installed the car seat in the passenger compartment of the automobile. In particular, switching from the transport position to the safety position is controlled by the means for controlling, which act for example on means for actuating, internal to the car seat, as soon as the force of the side impact exceeds a predetermined threshold. A car seat according to the invention therefore makes it possible to overcome the judgement of the operator who installed the car seat in the passenger compartment. Such a car seat therefore has more safety for the child than the seats of prior art.

Advantageously and according to at least one embodiment of the invention, means for controlling include or cooperate with means for actuating associated with said side flanks of the seat back, which transmit to one of said cheeks a side displacement applied to one of said side flanks, in the event of a violent impact on the latter.

According to this alternative, the car seat makes it possible to provide a response that is adapted to a violent impact with the purpose of optimising the protection of the child. Indeed, the side displacement of one of the cheeks can, if it is carried out according to a level of power that is excessive, generate risks linked to the compression of the child's head between the two side cheeks. If this said side displacement is carried out according to a power that is too low on the other hand, a risk is generated by the potential displacement of the child's head outside of the axis of the abdomen. According to this alternative, the effort that drives at least one of the side flanks, at the time of a violent impact, is transmitted to at least one of said cheeks in the form of a side displacement of an intensity less than or equal to that that drives said flanks, with a portion of the impact being absorbed by the flanks. The displacement of at least one of the side cheeks is therefore adapted to the intensity of the impact. Said displacement consequently makes it possible to effectively protect the child in the event of a violent impact, while still limiting the risks generated by the compression or a brutal displacement of the child's head.

These means for actuating can for example be directly integrated in the side flanks of the seat back.

As an alternative or as a combination, an upper portion of one of said side flanks comes into contact with a portion of the corresponding cheek, at least in the event of a violent impact.

According to this alternative, the putting into contact of one of the side flanks with a portion of the corresponding cheek allows for a rapid and complete transmission of the force generated by the impact, leading to the activation of an adapted displacement of at least one of the cheeks with the purpose of providing an optimum protection of the child.

Also according to this alternative, the means for actuating the displacement of the mobile portions of the cheeks are carried out without complex mechanisms, as such providing an increased reliability of the car seat in the event of a violent impact in particular, and therefore the effectiveness of the protection of the child.

Advantageously and according to at least one embodiment of the invention, the cheeks are mobile in rotation in relation to said back portion, according to an axis substantially parallel to said seat back.

According to this aspect, in the event of a violent impact, at least one of said side cheeks of the seat back tends to fold back onto the side of the child's face, thus forcing the head of said child to remain in the alignment of the axis of the abdomen. At least one of said side cheeks as such makes it possible to prevent the displacement of the child's head on the side in the event of a violent impact and/or towards the front, and as such the appearance of an angle between the head and the torso of the child.

Also according to this embodiment, at least one of said side cheeks, by folding back on the side of the child's face, significantly increases the surface in contact between said side cheek and the child's head. Because of this, the intensity of the force generated by the impact is distributed over a greater surface, leading to a local decrease in the stresses exerted and consequently in the risks of injury that can be caused by the latter.

Advantageously and according to this embodiment, the structure of said headrest is carried out in the same piece, presenting deformation zones allowing for the displacement of said cheeks in relation to the back portion.

The presence of zones of deformation in said headrest can make it possible to absorb the violence of a violent impact at the time of the transmission of the force of displacement between at least one of the side flanks and the child's head. Thus, said force of displacement tends to deform the structure of the headrest by causing a movement of the corresponding side cheek towards the child's head. This deformation phenomenon is supplied with a portion of the energy transmitted by the side flanks, leading to a reduction in the intensity of the force of displacement. In addition, in the case of the presence of zones of deformation at the interface between the cheeks and the child's head, the composition of the cheeks allows them to adapt to the child's head in the event of a violent impact, leading to an increase in the surface in contact and a relocation of the constraints exerted on the child's head. Because of this, the presence of zones of deformation in the headrest, according to this alternative of the invention, allows for a displacement of at least one of the side cheeks towards the child's head, while still absorbing the violence of the impact.

Advantageously and according to at least one embodiment of the invention, the cheeks include means for absorbing energy, able to cooperate with the head of a child in the event of a violent impact.

A zone of deformation such as described hereinabove is an example of a means for absorbing energy. The presence of such a means for absorbing energy in the side cheeks therefore confers the same advantages as those associated with the energy absorbing properties of the zones of deformation, namely a decrease in the intensity of the force of displacement transmitted from the side flanks to the child's head and a relocation of the constraints exerted on this said head, leading to a decrease in the risks of injury to the child in the event of a violent impact.

Advantageously and according to at least one embodiment of the invention, each of said cheeks comprises a deformable element and a push-button element, moving said deformable element towards the head of a child, in the event of a violent impact.

According to this alternative, the force of displacement is exerted over the entire interface between the push-button element and the deformable element, leading to an increase in the deformation phenomenon of the cheek when the latter enters into contact with the child's head, a better absorption by the cheek of the energy transmitted, a more substantial relocation of the constraints and consequently, a decrease in the risks of injury to the child in the event of a violent impact.

As an alternative or as a combination, said upper portion of one of said side flanks cooperates with said push-button element.

According to this alternative of the invention, the cooperation of at least one of said side flanks with said corresponding push-button element allows for a quasi-total transmission of the force of displacement generated by the impact. The speed of displacement of the corresponding cheeks is therefore adapted to the violence of the impact in order to allow the latter to rapidly block the child's head, as such limiting the risks of injury.

Advantageously and according to at least one embodiment of the invention, the deformable element is an element for dissipating energy, comprising at least one bag containing air (or another gas), in particular at atmospheric pressure, of which the wall is sealed (in the absence of stress) and has calibrated orifices, which allow for the progressive releasing of the air in the event of a strong stress, corresponding to a violent impact.

The walls of the device are preferably carried out with an elastic material, for example Ethylene Vinyl Acetate (or EVA) or low-density polyethylene, with a controlled thickness (for example between 1 and 2 mm) allowing for a deformation of the walls in the elastic range when the device is compressed. These walls allow for a returning to the initial shape of the device when the compression force applied is removed.

When the stresses are slow, only the rigidity of the walls offer a resistance to the force applied. On the other hand, in the event of an impact, the wall is deformed provoking a variation in the inside volume and therefore a leak of the air through the calibrated orifices. In this case, the resistance controlled by the air leak take precedence over the elastic resistance of the walls and results in a dissipation of energy.

This technique is for example described in patent document EP-10163494.

According to this alternative, the side cheeks have a good aptitude of being subjected to deformations, of absorbing the energy of an impact and consequently, a better capacity of absorbing the violence of an impact.

Advantageously and according to at least one embodiment of the invention, said means for controlling act on pyrotechnical or pressurised gas means.

According to this alternative, using pyrotechnical or pressurised gas means allows for the obtaining of great reactivity, over time, of the displacement of at least one portion of the side cheeks towards the safety position. By way of example, in the event of a violent impact, an explosive pellet primes the combustion of a solid fuel which sublimes to a gas in order to inflate an airbag.

Advantageously and according to this alternative, the means for controlling act on the deployment of an airbag.

The airbag is a system characterised by a very large capacity of deformation and therefore of absorption of the energy of an impact. According to this alternative, said airbag therefore allows for a better absorbing of the violence of the impact.

Also according to this alternative, said airbag can exert a dual function namely, the function of an absorber but also the function of putting the side cheeks into movement.

Advantageously and according to at least one embodiment of the invention, said threshold determining a violent impact corresponds to a force of a magnitude of 2000 Newtons.

Considering the weight of a young child to be equal to about 3 kg, a force of a magnitude 2000 Newtons corresponds to the impact that this said baby is subjected to after a fall of a little more than 3 meters in height. According to this alternative of the invention, adopting such a threshold makes it possible to guarantee the activation of the safety device in the event of an impact that can constitute a danger for the safety of the child.

DISCLOSURE OF THE INVENTION

Other purposes, characteristics and advantages of the invention shall appear when reading the following description provided solely for the purposes of information and is not restricted and which refers to the annexed figures wherein.

DISCLOSURE OF THE INVENTION

In the figures, the scales and the proportions are not systematically strictly respected and this, for the purposes of illustration and clarity. In the entire detailed description, which follows, in reference to the figures, unless mentioned otherwise, each piece of the car seat is described as it is arranged when the seat is installed in the passenger compartment of a motor vehicle. This arrangement is in particular shown in FIGS. 1 and 2.

The invention therefore proposes to implement means for controlling the displacement of at least one portion of a cheek of the headrest, in the event of a violent impact. According to the embodiments, these means for controlling also form means for actuating the displacement, cooperate with means for actuating, and/or control means for actuating.

Figure 1:
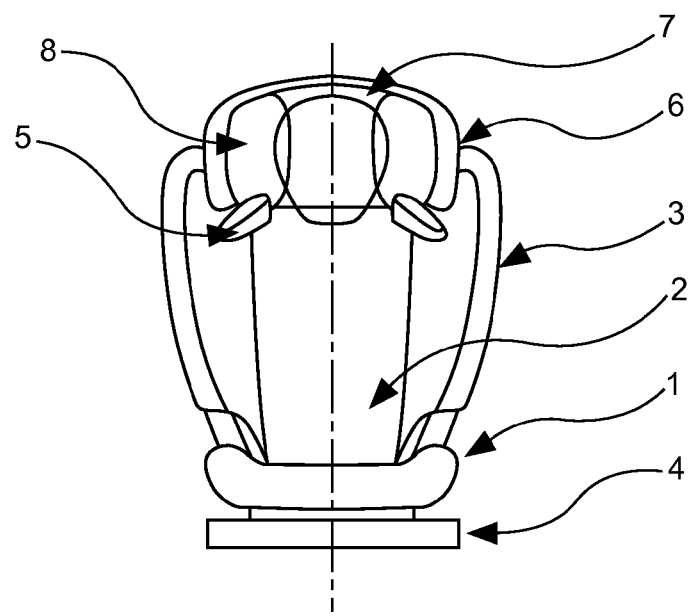
FIG. 1 is a diagrammatical front view of the car seat according to an embodiment of the invention, in transport position. The internal composition of the various structure elements of the seat is not shown for the purposes of clarity.
Figure 2:
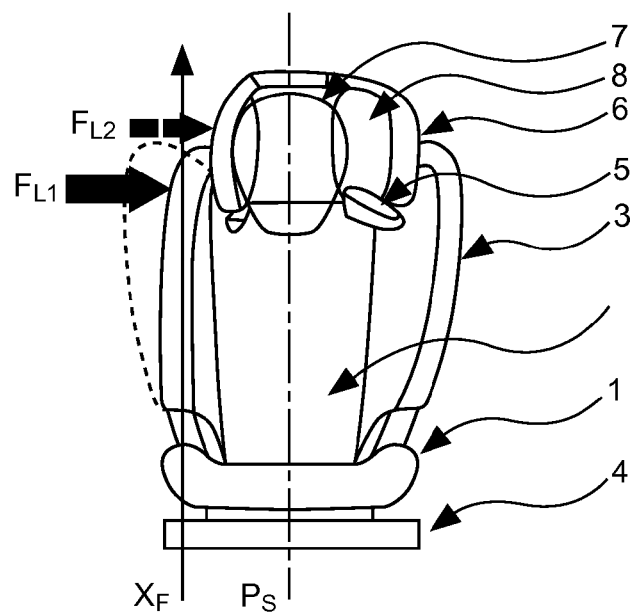
FIG. 2 is a diagrammatical front view of the car seat according to an embodiment of the invention, in safety position. The internal composition of the various structure elements of the seat is not shown for the purposes of clarity.
Figure 3:
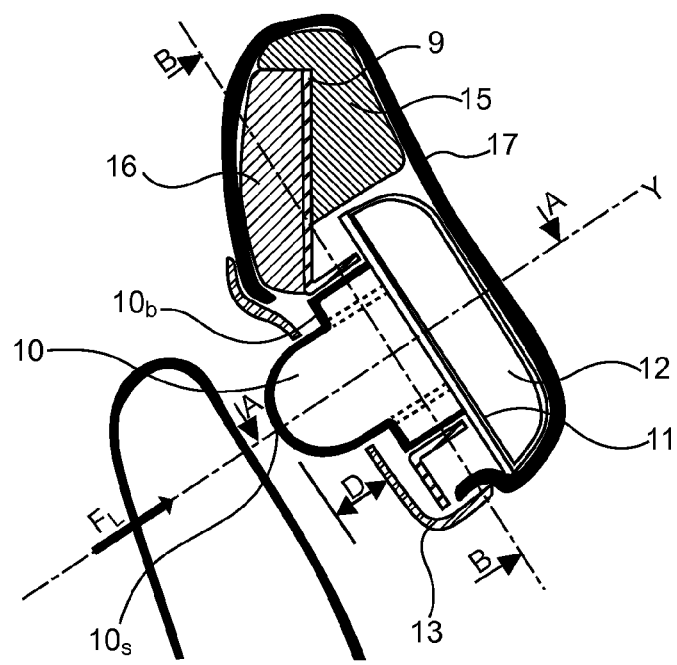
FIG. 3 is a diagrammatical cross-section view of one of the side cheeks according to an embodiment of the invention.
Figure 4:
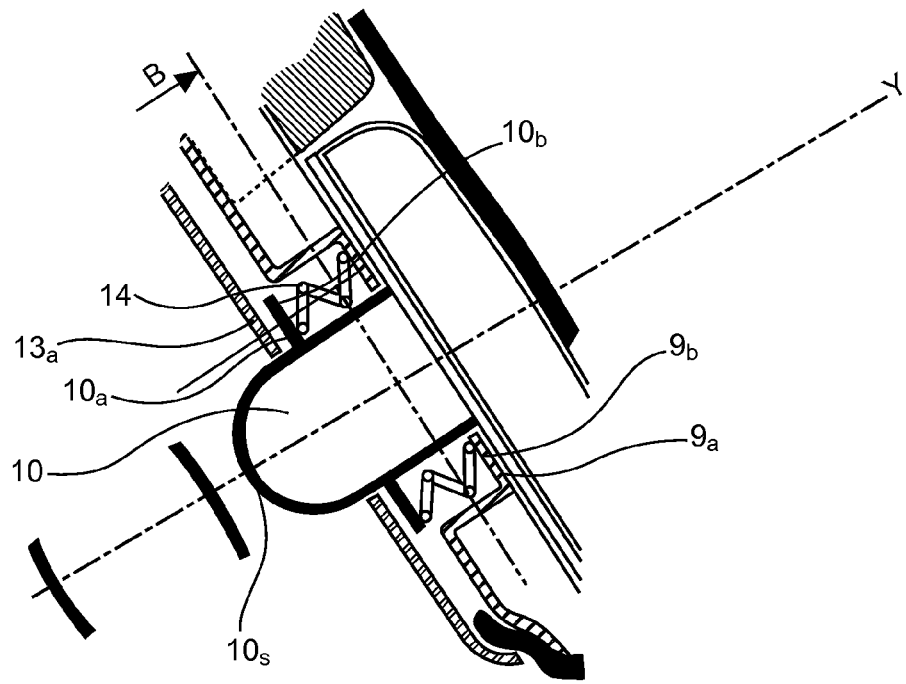
FIG. 4 is a diagrammatical view as a cross-section A-A of FIG. 3.

A car seat according to the embodiment of the figures shows a symmetry in relation to a plane of symmetry referenced as $P_S$ in the figures and which extends substantially along the plane of symmetry of the vehicle wherein the seat is installed. In other terms, this plane of symmetry, shown in particular in FIGS. 1 and 2, is vertical and extends longitudinally along the vehicle wherein the seat is installed.

The car seat comprises a seat bottom 1 horizontal and perpendicular to the plane of symmetry $P_S$, and a seat back 2 connected to the seat bottom 1 and arranged both perpendicularly to the seat bottom 1 and to the plane of symmetry $P_S$.

The seat bottom 1 is fastened onto a base 4, itself intended to be installed on the seat of a motor vehicle.

The seat back 2 is provided with two side flanks 3, connected, in this embodiment, to the seat back 2 by pivot connections having for axis of rotation, for at least one of these pivot links, an axis, referenced as $X_F$ in the figures, substantially parallel to the plane of symmetry $P_S$. In certain embodiments, the position of the side flanks can as such be adjusted, in order to adapt to the child transported. In other embodiments, the side flanks are not adjustable. In this case, the pivot connection can for example be replaced with a zone of deformation, making it possible to control the displacement of a flank, in the event of a side impact.

The seat back 2 is provided with a headrest 6, carrying in this embodiment two elements 5 for guiding a safety belt strap of the motor vehicle.

The headrest can be adjusted in height in relation to the seat back, according to various known techniques that implement for example a slide, or fixed in height in relation to the seat back, in particular if the seat bottom can be adjusted in height.

The headrest 6 comprises a back portion 7, substantially perpendicular to the plane $P_S$, and two side cheeks 8 extending from said back portion 7 in planes substantially parallel to the plane $P_S$. In the case where the headrest is fixed in relation to the seat back, the back portion 7 can be formed directly by the seat back.

In all that follows and due to the presence of a plane of symmetry $P_S$ within the structure of the car seat, only one of the two sides shall be described. Those skilled in the art will have no difficulty in reproducing the other side of the structure described for this side.

According to a first embodiment, shown in FIG. 2 in particular, the headrest 6 of the car seat and the side cheeks 8 are formed from a single piece in a locally flexible structure. The side cheeks 8 and the headrest 6 are for example formed from a ductile material, i.e. that has good capacities to be deformed plastically without breaking. This flexible structure allows for the mobility of the cheek between a transport position and a safety position wherein the cheek is moved closer to the child's head by deformation of this flexible structure.

In another embodiment, the side cheek is directly carried by the upper portion of the side flank in such a way that a displacement of the side flank causes a displacement of the side cheek via direct contact. Each side flank then forms the means for actuating the displacement of the mobile portion of the cheek of the transport position to the safety position.

In another embodiment, a space is arranged, in transport position, between the upper portion of the flank and the cheek in such a way that small impacts or vibrations inherent to the displacement of the vehicle do not disturb the child's head. On the other hand, in the event of a violent impact, the arranged space is filled in, and the upper portion of the side flank comes into contact against the cheek and provides for its displacement to the safety position. The space arranged between the cheek and the flank depends on the materials used and on the fixed predetermined threshold.

In all of the embodiments described until now, in the event of a violent side impact, the door of the vehicle enters into contact with the corresponding side flank 3 and exerts, on this same side flank 3, a side force of which the component normal to the plane $P_S$, referenced as $F_{L1}$ in the figures, directed towards the interior of the seat, pivots the side flank 3 according to its axis of rotation $X_F$.

The side force can also be transmitted without the intermediary of the side door of the vehicle, but simply via inertia due to the impact. In any case, the side flank 3 then enters into contact with the corresponding side cheek 8 (either directly if the cheek is carried by the side flank according to the first alternative described hereinabove, or after the filling in of the residual space according to the second alternative described hereinabove) and transmits a side force to it, referenced as $F_{L2}$ in the figures. Under the action of this side force $F_{L2}$, the side cheek 8 is moved and/or is deformed then towards the interior of the headrest 6 until it enters into contact with the child's head. This displacement and/or this deformation is supplied by the energy of the impact transmitted, leading to an absorption of this energy and an absorption of the impact exerted on the child's head. As the side cheek 8 is more preferably formed of a material having good ductility, it is deformed under the action of the force $F_{L2}$ without breaking and in such a way as to retain its initial shape.

According to the embodiments, the cheek 8 can as such be moved in rotation and/or in translation in relation to the back 7 of the headrest. The axis of rotation can be located on the back 7, or in the vicinity of the latter, for example on the cheek 8, which then has two portions, one fixed in relation to the back, and the other mobile.

The displacement is controlled, in order to specifically reach the predefined safety position, using means for guiding (grooves, axes, etc.) and/or abutment, forming means for controlling.

It is provided that at least the cheek located on the side of the impact is moved and/or is deformed. In certain embodiments, the two cheeks can be moved, simultaneously or in a manner slightly offset in time, symmetrically in relation to the plane $P_S$ or with different intensities or amplitudes. This can make it possible to limit the space between the two cheeks, and therefore prevent a rebound effect of the child's head after the first impact.

According to other embodiments and such as shown in FIGS. 3, 4, 5, 6, 7, 8 and 9, the side cheeks 8 include a proactive mechanical system, comprised of a push-button 10, forming means for actuating, a support 11 for a bag, or a pouch, which can be deformed and a bag 12. These various elements are all arranged along an axis referenced as Y in the figures and which extends perpendicularly to the plane $P_S$, passing through an upper portion of the side flank 3, the side cheek 8 and the centre of the child's head. This proactive set comprising the push-button 10, the support 11 and the bag 12 is arranged between the upper portion of the side flank 3 and the child's head.

The bag 12 can contain air, at atmospheric pressure. It has an elastic wall, for example made of EVA, which is sealed in the absence of a strong stress. The elastic wall is moreover pierced with calibrated orifices, which make it possible to release the air contained in the bag in a controlled manner, in the event of a strong stress, corresponding in particular to a violent impact. This makes it possible to effectively absorb a portion of the energy of the impact, while still offering good comfort at normal speed.

This mechanical proactive set is housed in a casing, for example made of plastic, forming means for controlling. This casing comprises an internal armature 9 and an external armature 13 that define an enclosure for receiving the proactive system and the side cheek 8. The proactive mechanical set is installed in the casing in such a way that its displacements are limited to translation movements exclusively according to the axis Y, a first position, referred to as backward position, and a second position, referred to as forward position, corresponding respectively to the transport and safety positions of the side cheeks.

The push-button 10 comprises a base joined together with the support 11 and a dome 10s forming an abutment, directed towards the lateral flank 3 of the car seat and intended to be struck by the upper portion of the side flank at the time of a violent impact. The push-button 10 further comprises two side wings 10b extending parallel to the base, midway between the base and the top of the dome 10s.

Structural elements 15, 16 that are deformable and/or rigid, arranged on either side of the internal armature 9, make it possible to isolate the latter in the side cheek 8, to give it its shape and to absorb the force that can be generated by an external impact. A flexible covering 17 is used to isolate the internal components of the side cheek 8 from their environment. This flexible covering 17 can be comprised of a fabric that is extensible and/or that comprises one or several fusible zones characterised by the presence of stitches, thinnings or portions that are laser cut and invisible to the naked eye.

Figure 5:
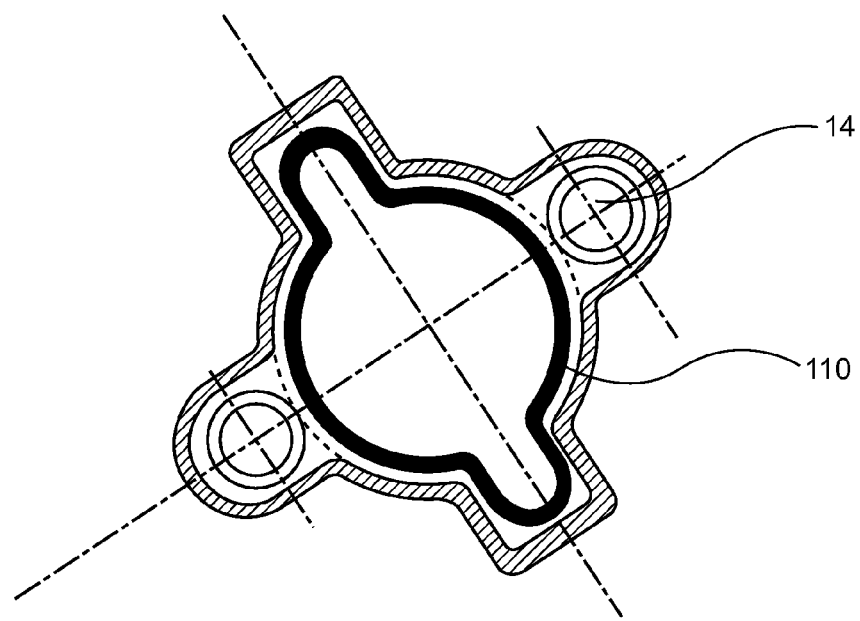
FIG. 5 is a diagrammatical view as a cross-section B-B of FIG. 3.
Figure 6:
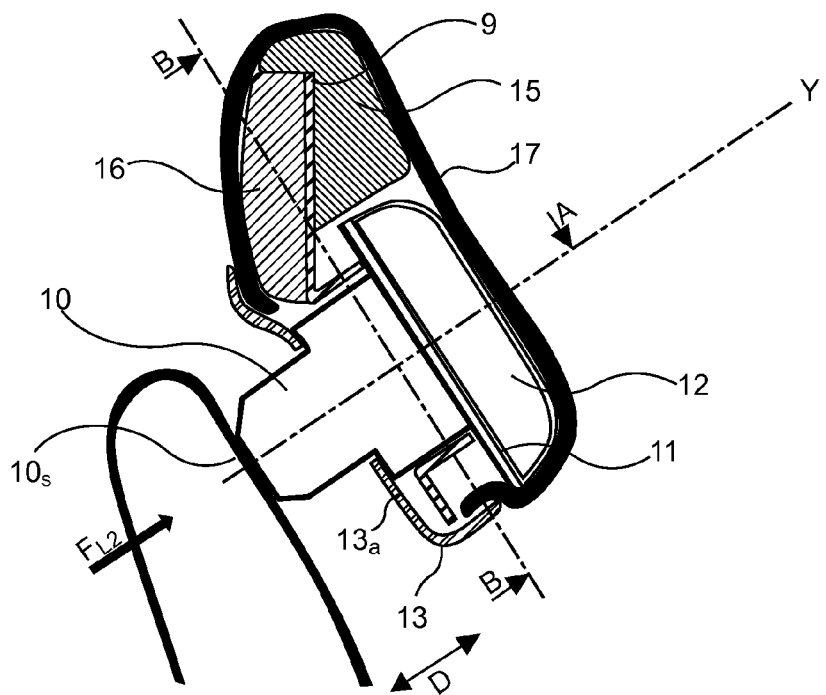
FIG. 6 is a diagrammatical view as a cross-section of one of the side cheeks according to an embodiment of the invention, in transport position.
Figure 7:
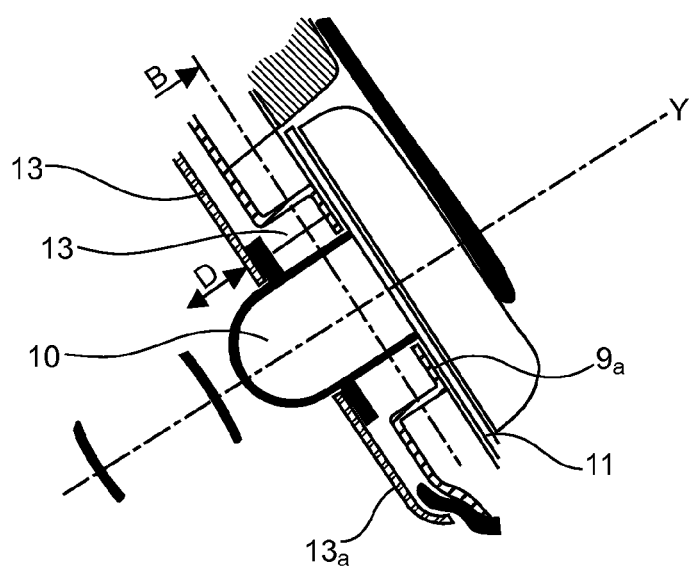
FIG. 7 is a diagrammatical view as a cross-section A-A of FIG. 6.
Figure 8:
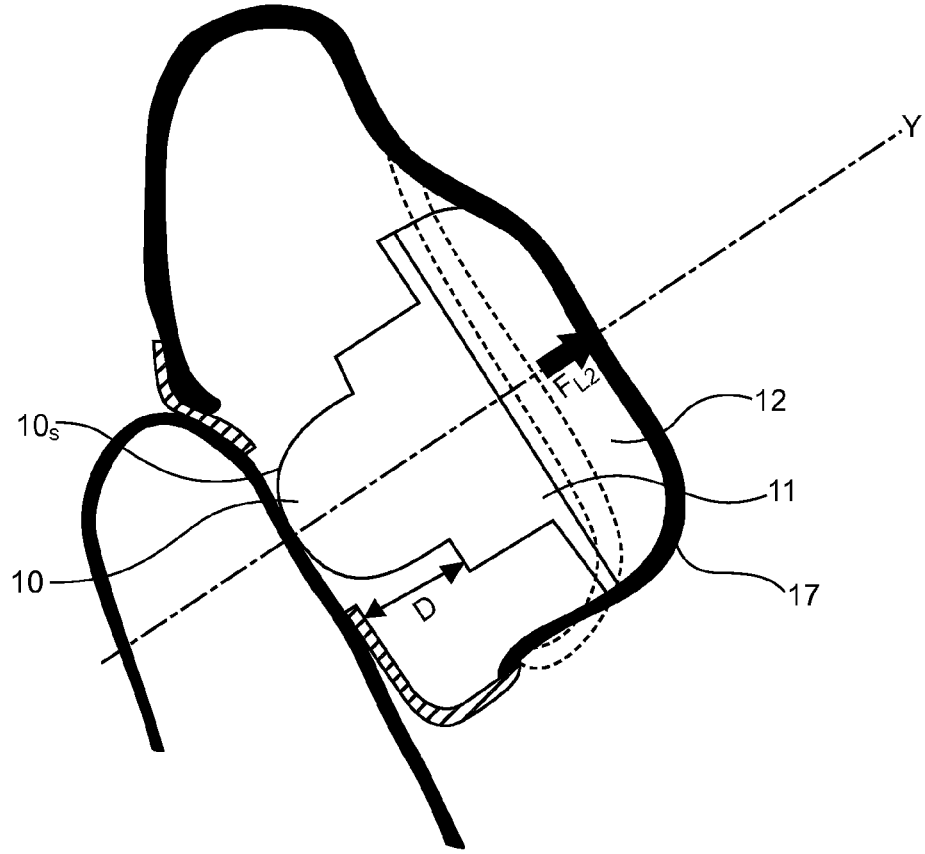
FIG. 8 is a diagrammatical view as a cross-section of one of the side cheeks according to an embodiment of the invention, in safety position.

In backward position, such as shown in FIGS. 5, 6 and 7, tensor springs 14, arranged on either side of the push-button 10, between the internal armature 9 and the wings 10b of the push-button 10 and extending substantially according to an axis parallel to the axis Y, maintain the push-button 10 in contact with a portion 13a of the external armature 13 while the support 11 of the airbag is maintained in contact with a portion 9a of the internal armature 9. In this position, the dome 10s forming an abutment 10 opens from the external armature 13 towards the upper portion of the side flank 3 through an orifice arranged for this purpose on the external armature 13. In backward position, the dome 10s forming an abutment protrudes by a distance D in relation to the external armature 13.

In the event of a violent side impact, the upper portion of the side flank enters into contact with the top of the dome 10s of the push-button 10, transmitting to it a side force $F_{L2}$. If this force $F_{L2}$ is greater than the tension force exerted by the springs 14, the push-button is then moved in translation according to the axis Y in the direction of the child's head, causing an identical displacement of the entire proactive mechanical system. In the absence of resistance to this displacement, the proactive mechanical system then reached the forward position. In this position, in particular shown in FIG. 8, the wings 10b of the push-button 10 compress the springs 14 and exert a force against the portion 9b of the internal armature 9 which carry the base of the springs. The airbag support 11 carried by the internal armature 9 drives the airbag 12 in displacement by a distance D towards the child's head, deforming at the same time the flexible covering 17.

Figure 9:
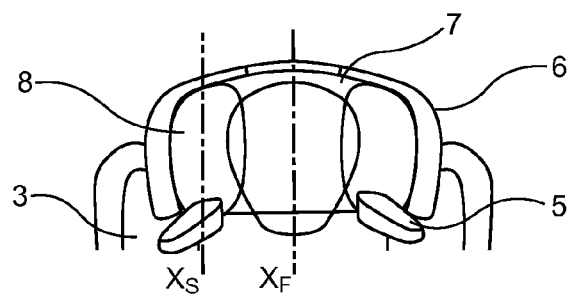
FIG. 9 is a diagrammatical front view of the headrest according to an embodiment of the invention.

According to another embodiment and such as shown in FIG. 9, the headrest 6, of rigid structure, is comprised of articulated side cheeks 8. For example, the side cheeks 8 are connected by a pivot connection with the rest of the headrest 6 according to an axis referenced by $X_J$ in the figures, substantially parallel to the axis $X_F$.

In transport position, the side cheek 8 is not in contact with the upper portion of the side flank 3, or with the child's head.

In the event of a side impact, the side flank 3 (forming at least one portion of the means for actuating) enters into contact with the side cheek 8, transmitting to it a side force $F_{L2}$. If this force $F_{L2}$ is greater, for example than 2000 Newtons, and in the absence of resistance, the side flank then pivots around the axis $X_J$ in the direction of the child's head.

Figure 10:
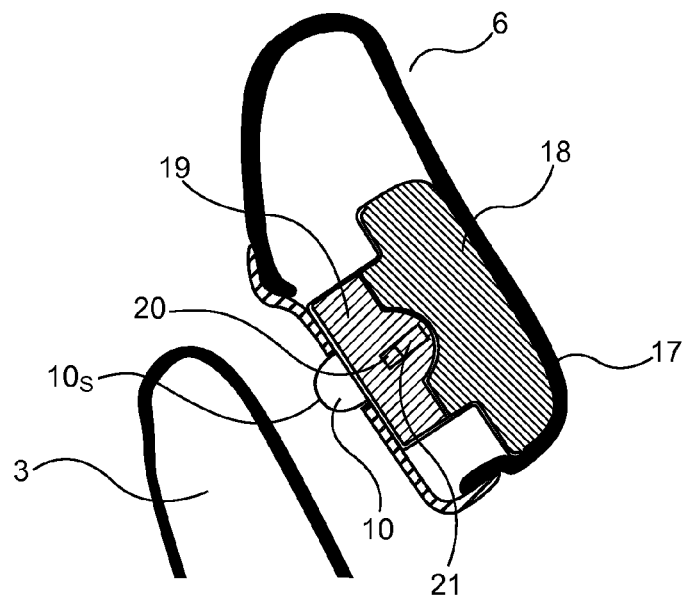
FIG. 10 is a diagrammatical of one of the side cheeks according to an embodiment of the invention, in transport position.
Figures 11A, 11B:
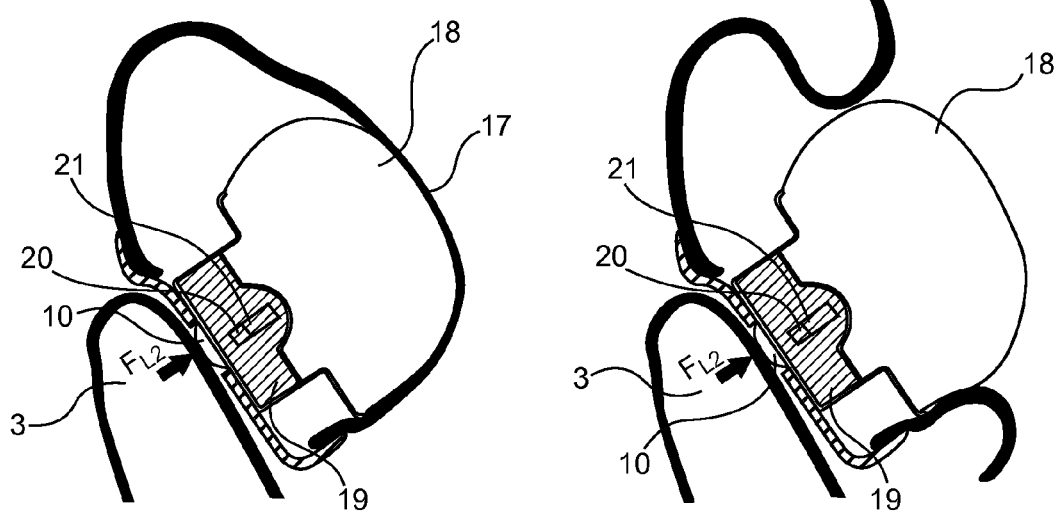
FIGS. 11A and 11B are diagrammatical views of the side cheek of FIG. 10, in safety position, with the covering fabric being respectively extensible or provided with fusible zones.

According to another embodiment and such as shown in FIGS. 10 and 11A, 11B the headrest 6, of rigid structure, integrates a set of the "airbag" type comprised of a pyrotechnical or gas subset and an airbag 18.

The shape of the airbag 18 can be defined in order to adapt to the child's morphology, in order to effectively protect his head and his neck.

In the event of a violent side impact, the side flank 3 enters into contact with the top 10s of the push-button 10, transmitting to it a side force $F_{L2}$. If this force $F_{L2}$ is greater, for example than 2000 Newtons, the push-button 10 is then moved in translation according to the axis Y in the direction of the child's head and pushes a metal striker 20. Said metal striker 20 then pierces a gas cartridge 21 which inflates the airbag 18, initially folded in the support 19 for airbag. The inflated bag 18 is then extracted from the support 19 for airbag, in a controlled manner: the bag 18 deforms (FIG. 11A) the covering 17, made of an elastic material, and/or tears (FIG. 11B) this covering 17, made of fusible zones provided for this purpose, in such a way as to move closer to the child's head, such as shown in FIGS. 11A, 11B.

The invention claimed is:

1. Child car seat, intended to be installed in particular in a motor vehicle, comprising a seat bottom and a seat back provided with side flanks and a headrest having a back portion, substantially parallel to the seat back, and two side cheeks extending from said back portion,
    characterised in that said seat comprises means for controlling a predetermined safety displacement of at least one portion of said side cheeks, in the event of a side impact against said seat from a first transport position to a second safety position, wherein a mobile portion of the cheek is moved closer to the child's head,
    said means for controlling providing said safety displacement at the time of a side impact having a force greater than a predetermined threshold.

2. Car seat according to claim 1, characterised in that an upper portion of one of said side flanks comes into contact with a portion of the corresponding cheek, at least at the time of said side impact.

3. Car seat according to claim 2, characterised in that said upper portion of one of said side flanks cooperates with said push-button element.

4. Car seat according to claim 1, characterised in that said cheeks are mobile in rotation in relation to said back portion, according to an axis substantially parallel to said seat back.

5. Car seat according to claim 4, characterised in that the structure of said headrest is carried out in the same piece, having zones of deformation that allow for the displacement of said cheeks in relation to the back portion.

6. Car seat according to claim 1, characterised in that said cheeks include means for absorbing energy, able to cooperate with the head of a child at the time of said side impact.

7. Car seat according to claim 1, characterised in that each of said cheeks comprises a deformable element and a push-button element, moving said deformable element towards the head of a child, at the time of said side impact.

8. Car seat according to claim 7, characterised in that said upper portion of one of said side flanks cooperates with said push-button element to move said deformable element towards the head of a child.

9. Car seat according to claim 7, characterised in that said deformable element comprises at least one bag with a sealed wall comprising calibrated orifices allowing for the controlled removal of the air contained in said bag at the time of said side impact.

10. Car seat according to claim 1, characterised in that said means for controlling include or cooperate with means for actuating associated with, and/or integrated in said side flanks of the seat back, and transmit to one of said cheeks a lateral displacement applied to one of said side flanks, at the time of said violent impact on the latter.

11. Car seat according to claim 1, characterised in that said means for controlling acting on pyrotechnical or pressurised gas means.

12. Car seat according to claim 11, characterised in that said means for controlling act on the deployment of an airbag.

13. Car seat according to claim 1, characterised in that said predetermined threshold determining said side impact corresponds to a force of a magnitude of 2000 Newtons.

14. A juvenile vehicle seat comprising
    a seat bottom,
    a seat back including a backrest extending upwardly from the seat bottom, a first side flank mounted on a first side of the backrest for movement about first upright axis relative to the backrest, a second side flank mounted on an opposite second side of the backrest for movement about a second upright axis relative to the backrest, the backrest being arranged to extend between the first and second side flanks, and a headrest having a back portion aligned with the backrest, a movable first side cheek coupled to a first side of the back portion to move relative to the back portion and arranged to lie between the first side flank and the back portion, and a movable second side cheek coupled to an opposite second side of the back portion to move relative to the back portion and arranged to lie between the back portion and the second side flank, and
    cheek-mover means for a controlling displacement of at least one portion of the movable first side cheek relative to the back portion and toward the movable second side cheek from a first transport position wherein the movable first and second side cheeks are separated from one another by a first distance to a second safety position wherein the movable first and second side cheeks are separated from one another by a relatively smaller second distance in response to inward movement of an actuator portion of the first side flank toward the movable first side cheek when the movable first side cheek occupies the first transport position during exposure of the seat back to an external impact force in excess of a predetermined force so that space available between the movable first and second side cheeks to receive a head of a child seated on the seat bottom is reduced to minimize movement of the head relative to the headrest following exposure of the seat back to the external impact force.

15. The juvenile vehicle seat of claim 14, wherein the first side flank includes a lower end located near the seat bottom and an opposite upper end located in spaced-apart relation to the seat bottom and the actuator portion is included in the opposite upper end.

16. The juvenile vehicle seat of claim 15, wherein the movable first side cheek includes a shell formed to include an interior region and a button aperture facing toward the actuator portion of the first side flank and opening into the interior region and the cheek-mover means includes a deformable element located in the interior region, a push button arranged to extend out of the interior region through the button aperture formed in the shell toward the actuator portion of the first side flank and mounted for movement relative to the shell from an extended position extending out of the interior region of the shell to lie in confronting relation to the actuator portion of the first side flank to a retracted position lying substantially in the interior region of the shell, and a spring arranged to lie in the interior region and urge the push button normally and yieldably to the extended position.

17. The juvenile vehicle seat of claim 16, wherein the push button is arranged to engage the actuator portion of the first side flank of the seat back during movement of the actuator portion toward the movable first side cheek and the spring is configured to define the predetermined force to provide means for retaining the push button substantially in the extended position whenever a force applied by the actuator portion to the push button is less than the predetermined force and for allowing the push button to move toward the retracted position to compress the spring and move the deformable element toward movable second side cheek and the head of a child seated on the seat bottom and located between the first and second side cheeks during inward movement of the actuator portion of the first side flank toward the movable first side cheek to engage the push button so that the space available between the movable first and second side cheeks is reduced.

18. The juvenile vehicle seat of claim 17, wherein the movable first cheek includes an internal armature located in the interior region of the shell, the push button includes a dome arranged to lie outside of the interior region and to be engaged by the actuator portion of the first side flank during inward movement of the actuator portion of the first side flank toward the movable first side cheek and a wing coupled to the dome and arranged to remain in the interior region of the shell during movement of the push button from the extended position to the retracted position, and the spring has a first end arranged to engage the internal armature and an opposite second end arranged to engage the wing.

19. The juvenile vehicle seat of claim 18, wherein the spring is arranged to lie between the wing and the deformable element.

20. The juvenile vehicle seat of claim 18, wherein the cheek-mover means further includes an element support having an inner side coupled to the deformable element and an opposite outer side coupled to the dome to move therewith.

21. The juvenile vehicle seat of claim 18, wherein the shell includes an external armature made of a rigid material and form to include the button aperture and a flexible covering coupled to the external armature and made of a deformable elastic material that has a first shape when the push button occupies the extended position and a deformed second shape when the push button occupies the retracted position in response to movement of the deformable element relative to and away from the external armature.

22. The juvenile vehicle seat of claim 21, wherein a perimeter edge of the flexible covering is trapped in a fixed position between opposing portions of the internal and external armatures.

23. The juvenile vehicle seat of claim 16, wherein the shell includes an external armature made of a rigid material and form to include the button aperture and a flexible covering coupled to the external armature and made of a deformable elastic material that has a first shape when the push button occupies the extended position and a deformed second shape when the push button occupies the retracted position in response to movement of the deformable element relative to and away from the external armature.

24. The juvenile vehicle seat of claim 23, wherein the flexible covering includes an interior surface arranged to form a boundary of a portion of the interior region of the shell and an exterior surface arranged to face away from the interior region of the shell, the deformable element is arranged to engage the interior surface of the flexible covering, and the push button includes an inner end arranged to lie in spaced-apart relation to a section of the flexible covering to the trap the deformable element therebetween and an outer end arranged to lie outside the interior region of the shell when the push button occupies the extended position to intercept the actuator portion of the first side flank during movement of the first side flank toward the movable first side cheek to cause the push button to move to assume the retracted position to cause a displacement of the movable first side cheek relative to the back portion and toward the movable second side cheek.

25. The juvenile vehicle seat of claim 14, wherein the headrest is mounted for up-and-down movement relative to the backrest without disalignment of the actuator portion of the first side flank and the movable first side cheek to establish that displacement of the at least one portion the movable first side check relative to the back portion is independent of a height position of the headrest relative to the backrest.

26. The juvenile vehicle seat of claim 14, wherein the cheek-mover means includes a deformable element located in an interior region formed in the movable first side cheek and a push button mounted for movement relative to the movable first side cheek and arranged to move the deformable element toward the movable second side cheek in response to application of an actuation force to the push button by the first side flank during exposure of the seat back to the external impact force.

27. The juvenile vehicle seat of claim 26, wherein the cheek-mover means further includes a spring having a first end engaging the push button and an opposite second send engaging the deformable element, the spring is configured normally and yieldably to urge the push button relative to the movable first side cheek to an extended position confronting the actuator portion of the first side flank, and the spring is sized to establish the predetermined force to retain the push button in the extended position until the actuator portion of the first side flank is moved relative to the backrest during exposure of the seat back to an external impact force in excess of the predetermined force to move the push button against a biasing force provided by the spring relative to the movable first side cheek to a retracted position to cause the deformable element to move toward the movable second side cheek.

28. The juvenile vehicle seat of claim 27, wherein the movable first side cheek includes a shell formed to include the interior region, and a button aperture opening into the interior region, the push button is arranged to extend through the button aperture and formed to include a dome arranged to lie outside the interior region and to be engaged by the actuator portion of the first side flank during inward movement of the actuator portion of the first side flank toward the movable first cheek and a wing coupled to the dome and arranged to remain the interior region of the shell during movement of the push button from the extended position of the retracted position, and the spring is arranged to lie between the wing and the deformable element.

29. The juvenile vehicle seat of claim 28, wherein the shell includes an external armature made of a rigid material and form to include the button aperture and a flexible covering coupled to the external armature and made of a deformable elastic material that has a first shape when the push button occupies the extended position and a deformed second shape when the push button occupies the retracted position in response to movement of the deformable element relative to and away from the external armature.

30. The juvenile vehicle seat of claim 26, wherein the deformable element comprises at least one bag containing air at atmospheric pressure in an interior region bounded by a wall formed to include at least one calibrated orifice to allow for progressive release of the air from the bag during exposure of the seat back to an external force.

31. The juvenile vehicle seat of claim 14, wherein the first side flank is mounted for pivotable movement relative to the backrest about a first upright pivot axis, the movable first side cheek is mounted for pivotable movement relative to the back portion about a second upright pivot axis, and the movable first side cheek is directly carried by the actuator portion of the first side flank in such a way that pivoting movement of the first side about the first upright pivot axis toward the movable second side cheek applies a side force to pivot the movable first side cheek toward the movable second side cheek during exposure of the seat back to an external force in excess of the predetermined force.

32. The juvenile vehicle seat of claim 14, further comprising second check-mover means for controlling displacement of at least one portion of the movable second side check relative to the back portion and toward the movable first side cheek independent of movement of the movable first side cheek relative to the back portion from a first transport position wherein the movable first and second side cheeks are separated from one another by a first distance to a second safety position wherein the movable first and second side cheeks are separated from one another by a relatively smaller second distance in response to inward movement of an actuator portion of the second side flank toward the movable second side cheek when the movable second side cheek occupies the first transport position during exposure of the seat back to an external impact force in excess of a predetermined force so that space available between the movable first and second side cheeks to receive a head of a child seated on the seat bottom is reduced to minimize movement of the head relative to the headrest following exposure of the seat back to the external impact force.

33. The juvenile vehicle seat of claim 32, wherein the second side flank includes a lower end located near the seat bottom and an opposite upper end located in spaced-apart relation to the seat bottom and the actuator portion is included in the opposite upper end.

* * * * *